(12) United States Patent
Jouan

(10) Patent No.: US 11,920,518 B2
(45) Date of Patent: Mar. 5, 2024

(54) CRYOGENIC FUEL SUPPLY SYSTEM FOR A TURBINE ENGINE COMBUSTION CHAMBER

(71) Applicant: SAFRAN, Paris (FR)

(72) Inventor: Hugo Pierre Mohamed Jouan, Moissy-Cramayel (FR)

(73) Assignee: SAFRAN, Paris (FR)

( * ) Notice: Subject to any disclaimer, the term of this patent is extended or adjusted under 35 U.S.C. 154(b) by 0 days.

(21) Appl. No.: 17/927,567

(22) PCT Filed: May 25, 2021

(86) PCT No.: PCT/FR2021/050944
§ 371 (c)(1),
(2) Date: Nov. 23, 2022

(87) PCT Pub. No.: WO2021/240107
PCT Pub. Date: Dec. 2, 2021

(65) Prior Publication Data
US 2023/0212982 A1 Jul. 6, 2023

(30) Foreign Application Priority Data
May 28, 2020 (FR) ..................................... 2005644

(51) Int. Cl.
*F02C 7/224* (2006.01)
(52) U.S. Cl.
CPC ........ *F02C 7/224* (2013.01); *F05D 2220/323* (2013.01)
(58) Field of Classification Search
CPC ...... F02C 7/224; F02C 3/20; F05D 2220/323; F01D 5/30; F01D 5/08
See application file for complete search history.

(56) References Cited

U.S. PATENT DOCUMENTS

| 5,272,870 A | 12/1993 | Grieb et al. |
| 2011/0083444 A1* | 4/2011 | Bathina ..................... F02C 7/22 60/776 |

(Continued)

FOREIGN PATENT DOCUMENTS

GB 1392 783 A 4/1975

OTHER PUBLICATIONS

Preliminary Search Report of FR 2005644 dated Feb. 25, 2021.
International Search Report of PCT/FR2021/050944 dated Sep. 14, 2021 [PCT/ISA/210].

*Primary Examiner* — Todd E Manahan
*Assistant Examiner* — Rodolphe Andre Chabreyrie
(74) *Attorney, Agent, or Firm* — Sughrue Mion, PLLC

(57) ABSTRACT

A cryogenic fuel supply system includes a storage tank, a mixing chamber, an auxiliary heating device, a heat exchanger, and flow distribution devices, and a controller. The storage tank stores cryogenic fuel in a liquid state. The mixing chamber receives various flows of cryogenic fuel in a supercritical or gaseous state, the mixing chamber being connected to a combustion chamber to supply the combustion chamber with cryogenic fuel in the supercritical or gaseous state. The auxiliary heating device heats the cryogenic fuel. The heat exchanger assembly includes a cryogenic fuel/oil heat exchanger and a heat exchanger between the cryogenic fuel and the air circulating in a primary duct of the turbine engine. A flow distribution device is upstream of the auxiliary heating device, and one or more flow distribution devices are disposed upstream of the heat exchanger assembly. The controller controls opening and closing of the flow distribution devices.

16 Claims, 2 Drawing Sheets

(56) References Cited

U.S. PATENT DOCUMENTS

| | | |
|---|---|---|
| 2015/0000298 A1 | 1/2015 | McAlister |
| 2015/0337730 A1* | 11/2015 | Kupiszewski ............ F02C 7/16 |
| | | 60/39.465 |
| 2021/0305674 A1* | 9/2021 | Rhoden ................... F02C 7/224 |
| 2021/0340908 A1* | 11/2021 | Boucher ................... F02C 3/22 |
| 2021/0348561 A1* | 11/2021 | Cocks ....................... F02C 7/12 |

* cited by examiner

CRYOGENIC FUEL SUPPLY SYSTEM FOR A TURBINE ENGINE COMBUSTION CHAMBER

CROSS REFERENCE TO RELATED APPLICATIONS

This application is a National Stage of International Application No. PCT/FR2021/050944, filed May 25, 2021, claiming priority to French Patent Application No. 2005644, filed May 28, 2020, the contents of which being herein incorporated by reference in their entireties.

FIELD OF THE INVENTION

The invention is in the field of aircraft turbine engines.

The present invention relates, more precisely, to a cryogenic fuel supply system for the combustion chamber of an aircraft turbine engine and to an aircraft turbine engine successively comprising at least one air compressor, a combustion chamber supplied with cryogenic fuel and at least one turbine, this turbine engine being equipped with said cryogenic fuel supply system.

PRIOR ART

Cryogenic fuels are usually used for space propulsion because they enable better thermodynamic yields. Their transposition to the field of aeronautics and the industrialisation of their large-scale use however requires a certain number of technical problems to be solved.

Thus, the use of liquid hydrogen has been proposed because it would enable $CO_2$ emissions to be reduced to zero.

Another cryogenic fuel that can be used is "liquefied" natural gas" (known by the acronym LNG), which, in comparison to liquid hydrogen, has the additional advantage of being able to be used at much higher temperature, since its liquefaction temperature at 1 bar ($10^5$ Pa) is minus 161° C. as opposed to minus 252° C. for liquid hydrogen, which simplifies its use.

In the two above-mentioned cases, these cryogenic fuels still need to be transported in liquid form in order that their volume to be carried out in the aircraft is acceptable, then vaporised and thus heated in order to be able to be used in a combustion chamber.

It could also be desirable to use the cryogenic fuel in the combustion chamber, no longer in the gaseous state but in the supercritical fluid state, which is not provided for in the cited prior art. As a reminder, it will be recalled that the fuel achieves the supercritical fluid state when it is at a temperature greater than its critical temperature and at a pressure greater than its critical pressure.

Also known from document US 2015/000298 is a cryogenic fuel supply system for the combustion chamber of a turbine engine, the latter also comprising a compressor and a turbine. The LNG cryogenic fuel is stored in a tank.

This system also has a heat exchanger assembly which comprises an exchanger between the cryogenic fuel and the exhaust gas and an exchanger between the cryogenic fuel and the air circulating in the primary duct.

However, this document does not describe a mixing chamber or a cryogenic fuel/oil heat exchanger or an auxiliary heating device.

DISCLOSURE OF THE INVENTION

One object of the invention is therefore to provide a cryogenic fuel supply system for the combustion chamber of a turbine engine of an aircraft, which can vaporise the liquid cryogenic fuel or bring it to a supercritical fluid state in an ecologically and energetically advantageous manner.

To this effect, the invention relates to a cryogenic fuel supply system for the combustion chamber of an aircraft turbine engine, this turbine engine successively comprising at least one air compressor, said combustion chamber and at least one turbine, this supply system comprising:
  a storage tank for this cryogenic fuel in the liquid state,
  a mixing chamber receiving various flows of cryogenic fuel in the supercritical or gaseous state, this mixing chamber being connected to said combustion chamber in order to supply it with cryogenic fuel in the supercritical or gaseous state.

According to the invention, this supply system comprises:
  an auxiliary heating device mounted in a line which connects said tank to the mixing chamber, this auxiliary heating device enabling heating of the cryogenic fuel,
  a heat exchanger assembly, connected to said cryogenic fuel tank and to said mixing chamber, and mounted in parallel with said auxiliary heating device, this heat exchanger assembly comprising a cryogenic fuel/oil heat exchanger and a heat exchanger between the cryogenic fuel and the air circulating in the primary duct of the turbine engine,
  a flow distribution device disposed upstream of the auxiliary heating device, at least one flow distribution device disposed upstream of the heat exchanger assembly, the opening and the closing of these various flow distribution devices being controlled by a central control unit.

Through these features of the invention, and in particular the presence of the auxiliary heating device, it is possible to have a cryogenic fuel/oil heat exchanger and an exchanger between the cryogenic fuel and the air circulant in the primary duct of the turbine engine, of smaller dimensions, which are therefore less heavy and which generate fewer pressure drops and less reduction in the thrust of the aircraft. Thus, the supply system according to the invention is more ecological and energetically more efficient.

According to other advantageous and non-limiting features of the invention, taken alone or in combination:
  the system comprises a pump, disposed at the outlet of the liquid cryogenic fuel tank and upstream of said auxiliary heating device and of said heat exchanger assembly, and in that this pump can bring the cryogenic fuel originating from the storage tank to a pressure greater than the critical pressure of this cryogenic fuel;
  the auxiliary heating device, the cryogenic fuel/oil heat exchanger and the heat exchanger between the cryogenic fuel and the air circulating in the primary duct of the turbine engine are supercritical exchangers that can bring the cryogenic fuel to a temperature greater than its critical temperature;
  the system comprises a pump, disposed at the outlet of the liquid cryogenic fuel tank and upstream of the auxiliary heating device and of the heat exchanger assembly, this pump being able to pressurise the cryogenic fuel leaving the tank, in order that it is totally liquid;
  the auxiliary heating device, the cryogenic fuel/oil heat exchanger and the heat exchanger between the cryogenic fuel and the air circulating in the primary duct of the turbine engine are two-phase exchangers which can heat the cryogenic fuel in the liquid state in order to bring it into the gaseous state;
  said turbine engine is a twin-spool turbine engine successively comprising a low-pressure air compressor, a high-pressure air compressor, said combustion chamber, a high-pressure turbine and a low-pressure turbine, and said heat exchanger between the cryogenic fuel and the air circulating in the primary duct of the turbine engine is an inter-compressor cooling exchanger disposed between the low-pressure air compressor and the high-pressure air compressor and performing the heat exchange with the air taken in the primary duct, downstream of said low-pressure air compressor of the turbine engine.

said heat exchanger between the cryogenic fuel and the air circulating in the primary duct of the turbine engine is a heat recuperator performing the heat exchange with the air taken in the primary duct, downstream of the turbine of the turbine engine;

the auxiliary heating device is an electrical or thermal device.

According to a first alternative embodiment, said inter-compressor cooling exchanger is mounted in series with the cryogenic fuel/oil heat exchanger, preferably upstream thereof.

According to a second alternative embodiment, said inter-compressor cooling exchanger is mounted in parallel with the cryogenic fuel/oil heat exchanger.

The heat recuperator and the cryogenic fuel/oil heat exchanger are preferably mounted in series, the heat recuperator being mounted upstream or downstream of the cryogenic fuel/oil heat exchanger.

Advantageously, the system comprises a fuel compressor, disposed between the mixing chamber and the combustion chamber.

The cryogenic fuel is preferably liquefied natural gas or liquid hydrogen.

The flow distribution device is preferably a valve.

The invention also relates to a turbine engine of an aircraft successively comprising at least one air compressor, a combustion chamber supplied with cryogenic fuel and at least one turbine. According to the invention, said turbine engine comprises a cryogenic fuel supply system for said combustion chamber, as mentioned above.

Finally, the invention relates to a method for controlling the cryogenic fuel supply system for said combustion chamber as mentioned above, which comprises the steps consisting of:

during the take-off phase of the aircraft, opening said flow distribution device disposed upstream of the auxiliary heating device and said at least one flow distribution device disposed upstream of the heat exchanger assembly, so as to cause the cryogenic fuel that is to be heated, to circulate in said auxiliary heating device and in said heat exchanger assembly, and during the other flight phases of the aircraft, closing said flow distribution device disposed upstream of the auxiliary heating device and opening said at least one flow distribution device disposed upstream of the heat exchanger assembly, so as to cause the cryogenic fuel that is to be heated, to circulate only in said heat exchanger assembly.

DESCRIPTION OF THE FIGURES

Other features, aims and advantages of the invention will emerge from the following description, which is given purely by way of illustration and not being limiting and which should be read with reference to the attached drawings, in which.

In all of the figures, identical elements have identical reference signs.

DETAILED DESCRIPTION OF THE INVENTION

The invention relates to a cryogenic fuel supply system for the combustion chamber of a turbine engine of an aircraft, such as an aeroplane.

Figure 1:
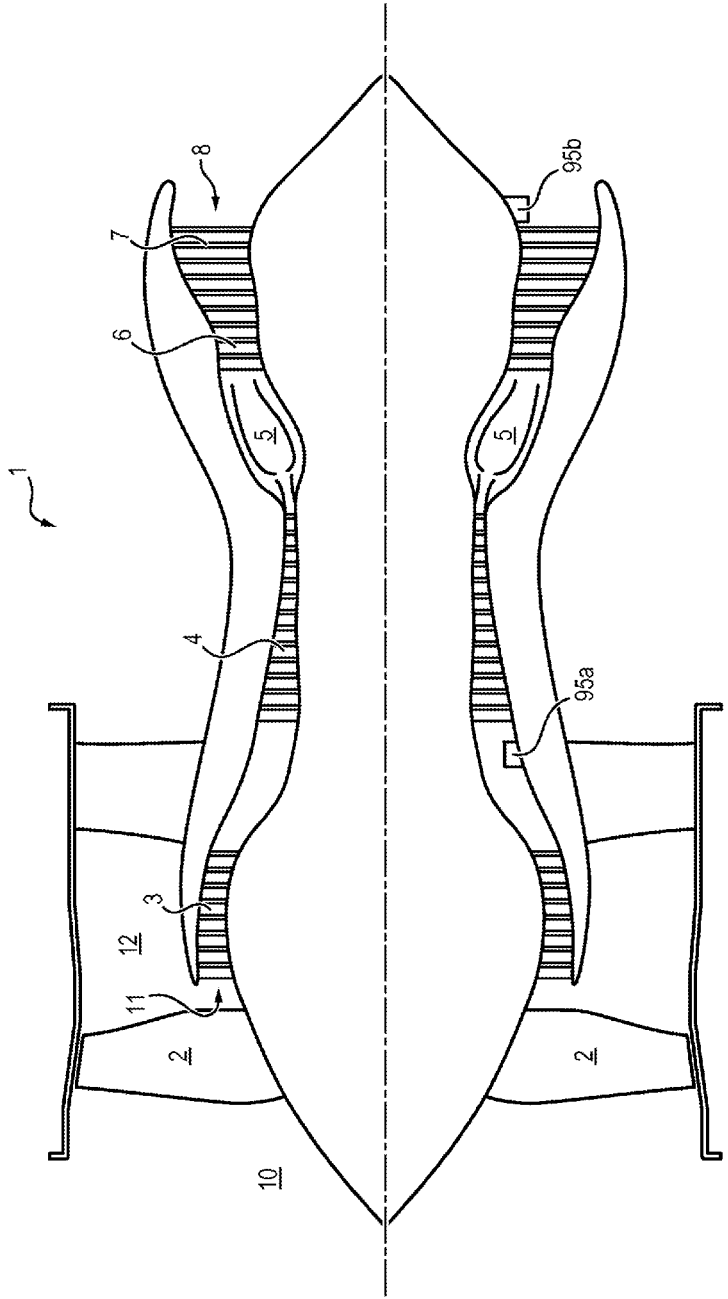
FIG. 1 shows an overview of a turbine engine, equipped with the cryogenic fuel supply system for its combustion chamber, only part of which is visible in this figure.

FIG. 1 shows an example of such a turbine engine. In this case, this is a twin-spool bypass turbine engine.

This turbine engine 1 comprises successively, in the direction of the air circulation, in other words from upstream (to the left in FIG. 1) to downstream (to the right in FIG. 1), an air inlet 10 in which a fan 2 is located, which delivers the air, on the one hand, into a primary duct 11 and, on the other hand, into a secondary duct 12. The term "duct" shall mean the volume (here in the form of an annular channel) through which an air flow circulates.

The air flow circulating in the primary duct 11 passes successively through a low-pressure air compressor 3, a high-pressure air compressor 4, a combustion chamber 5, a high-pressure turbine 6 and a low-pressure turbine 7, before being discharged through a primary flow nozzle 8.

Other types of turbine engine could be equipped with the cryogenic fuel supply system in accordance with the invention, without going beyond the scope of the invention, for example a single-spool turbine engine, which then comprises only one air compressor and only one turbine, connected together by a shaft, the combustion chamber being interposed between this air compressor and this turbine.

The cryogenic fuel supply system 9 in accordance with the invention, will now be described in conjunction with FIG. 2.

This system 9 comprises a tank 90 for storage of cryogenic fuel in the liquid state. This cryogenic fuel is intended to supply the combustion chamber 5, via various lines which will be described below.

This cryogenic fuel is, for example, liquefied natural gas or liquid hydrogen.

The system 9 also comprises a mixing chamber 91 which receives various flows of cryogenic fuel in the gaseous or supercritical state, as will be described below. This mixing chamber 91 is connected to the combustion chamber 5 by at least one line 900. In addition, the fuel is preferably injected into the combustion chamber 5 by at least one injector that is not shown in the figures.

Optionally, a fuel compressor 97 can be disposed in the line or lines 900, between the mixing chamber 91 and the combustion chamber 5. This compressor 97 can increase the pressure at which the cryogenic fuel is injected into the combustion chamber 5.

The system 9 also comprises an auxiliary heating device, mounted in a line 901, which connects the tank 90 to the mixing chamber 91.

According to a first embodiment of the invention, this auxiliary heating device, reference sign 92, can heat the cryogenic fuel and cause a phase change to bring it from the liquid phase to the gaseous phase. According to a second embodiment of the invention, this auxiliary heating device, referred to as "supercritical" type and with reference sign 92', can heat the cryogenic fuel and bring it to a temperature greater than its critical temperature.

This auxiliary heating device 92, 92' is preferably electrical or thermal. This can be for example coils, inside which said cryogenic fuel circulates, these coils being placed in a liquid (glycolated water, for example) heated by the combustion of a small flow of fuel. It can also be an electrical resistor placed in the flow of cryogenic fuel.

A pump is preferably disposed in the line 901, at the outlet of the tank 90 and upstream of the auxiliary heating device 92.

According to a first embodiment of the invention, this pump, reference sign 96, can pressurise the cryogenic fuel leaving the tank 90 and thus guarantee that it is indeed liquid and does not contain any gas, before being introduced into the various exchangers described below.

According to a second embodiment of the invention, this pump, referred to as "supercritical" type and with reference sign 96', can bring the cryogenic fuel, originating from the tank 90, to a pressure greater than its critical pressure.

A flow distribution device 98a is also preferably disposed in the line 901, upstream of the auxiliary heating device 92, 92' and downstream of the pump 96, 96'. This flow distribution device 98a is preferably a valve and will be referred to as such in the remainder of the description.

According to a first embodiment of the invention, a heat exchanger assembly, generally given reference sign 93, is connected to the storage tank 90 and to the mixing chamber 91. It is mounted in parallel with the auxiliary heating device 92. This heat exchanger assembly 93 comprises a cryogenic fuel/oil heat exchanger 94 and a heat exchanger 95 between the cryogenic fuel and the air circulating in the primary duct 11 of the turbine engine 1.

The cryogenic fuel/oil heat exchanger 94 is for example a plate exchanger, in order to have an optimal heat transfer between the two flows. The oil, which is used for lubrication and cooling of various mechanical members of the aircraft, such as rotors, shafts, bearings or reduction gears for example, is hot when it leaves these various members and enters the exchanger 94 where it delivers the heat to the cryogenic fuel circulating there. This cryogenic fuel heats up and changes phase in order to pass from the liquid state to the gaseous state. Inversely, the cryogenic fuel delivers cold to the oil, which, once cooled, can then be returned to the various above-mentioned mechanical members, in order to cool these and thus contribute to the improvement of their thermodynamic efficiencies.

The heat exchanger 95 between the cryogenic fuel and the air circulating in the primary duct 11 of the turbine engine can be an inter-compressor cooling exchanger, which then has reference sign 95a. This inter-compressor cooling exchanger is disposed in the primary duct 11, between the low-pressure air compressor 3 and the high-pressure air compressor 4, (see FIG. 1). The air circulating in the primary duct 11 is heated after passing through the low-pressure air compressor 3 and can deliver heat to the cryogenic fuel, in order to bring it into the vapour phase.

This exchanger 95a is for example a plate and/or fin exchanger.

In the case of a fin exchanger, the fins are located in the primary duct 11 and are heated by the air circulating there. However, these fins constitute a contact surface which generates pressure drops in the primary duct 11.

In the case of a plate exchanger, this is disposed on a wall of the primary duct 11, preferably one of the inner annular walls of this duct, in order to limit the length of the lines connecting it to the mixing chamber 91.

Whatever the type of exchanger 95a, it constitutes an obstacle which hinders the circulation of the air flow in the primary duct 11.

Through the presence of the auxiliary heating device 92, it is thus possible to use an inter-compressor cooling exchanger 95a of smaller dimensions, that is lighter and less bulky, than if this device 92 were not present.

The inter-compressor cooling exchanger 95a can thus be dimensioned in order to provide only the heating of the flow of cryogenic fuel that is necessary during the cruising flight phase of the aircraft.

When it is necessary to heat a larger flow of cryogenic fuel, for example during a take-off phase of the aircraft during which the engine must deliver more power and consume more fuel, it is then possible to also use the auxiliary heating device 92 to heat an additional flow of cryogenic fuel. When the aircraft returns to cruise mode, use of the auxiliary heating device 92 ceases and only the inter-compressor cooling exchanger 95a with smaller dimensions is used, therefore generating fewer pressure drops in the duct 11.

The heat exchanger 95 between the cryogenic fuel and the air circulating in the primary duct 11 of the turbine engine can also be a heat recuperator, which is then given the reference sign 95b. This heat recuperator 95b is disposed in the primary duct 11, downstream of the low-pressure turbine 7, (see FIG. 1), preferably at the outlet nozzle 8. The air circulating in the primary duct 11, downstream of the low-pressure turbine 7 and in particular at the outlet nozzle 8, is hot and can deliver heat to the cryogenic fuel in order to bring it into the vapour phase. This heat recuperator 95b is for example a plate or fin exchanger.

This heat recuperator 95b has the advantage of using heat which would otherwise be lost, since the hot air leaving the nozzle 8 escapes out of the aircraft. It also presents fewer installation constraints in the turbine engine than the exchanger 95a.

It should be noted that when the turbine engine 1 is single-spool, the heat exchanger 95 is then preferably a heat recuperator 95b recovering the heat from the air leaving the turbine. It would be possible to have a heat exchanger similar to the above-mentioned exchanger 95a, but disposed in front of the single air compressor, because the cryogenic fuel has a lower temperature than the air entering into the duct 11 and a heat exchange is therefore possible. However, such a heat exchanger would undoubtedly be less efficient.

According to a first alternative embodiment of the invention, the heat exchanger 95 and the heat exchanger 94 are mounted in parallel to one another. They are therefore also mounted in parallel with the auxiliary heating device 92.

In this case, the cryogenic fuel/oil heat exchanger 94 is mounted in a line 902, which connects the tank 90 (or the pump 96 when this is present) to the mixing chamber 91. As shown in FIG. 2, it is also possible to connect the line 902 to a branching point 903 located in the line 901, downstream of the pump 96 and upstream of the valve 98a. A flow distribution device 98b is preferably disposed in the line 902, upstream of the cryogenic fuel/oil heat exchanger 94 and downstream of the pump 96.

Furthermore, the heat exchanger 95, 95a, 95b is mounted in a line 904, which connects the tank 90, (or the pump 96 when this is present) to the mixing chamber 91. As shown in FIG. 2, it is also possible to connect the line 904 to the branching point 903. A flow distribution device 98c is preferably disposed in the line 904, upstream of the heat exchanger 95 and downstream of the pump 96.

According to a second alternative embodiment of the invention, the heat exchanger 95 and the heat exchanger 94 are mounted in series. The heat exchanger 95, 95a, 95b can thus be upstream or downstream of the heat exchanger 94.

Figure 2:
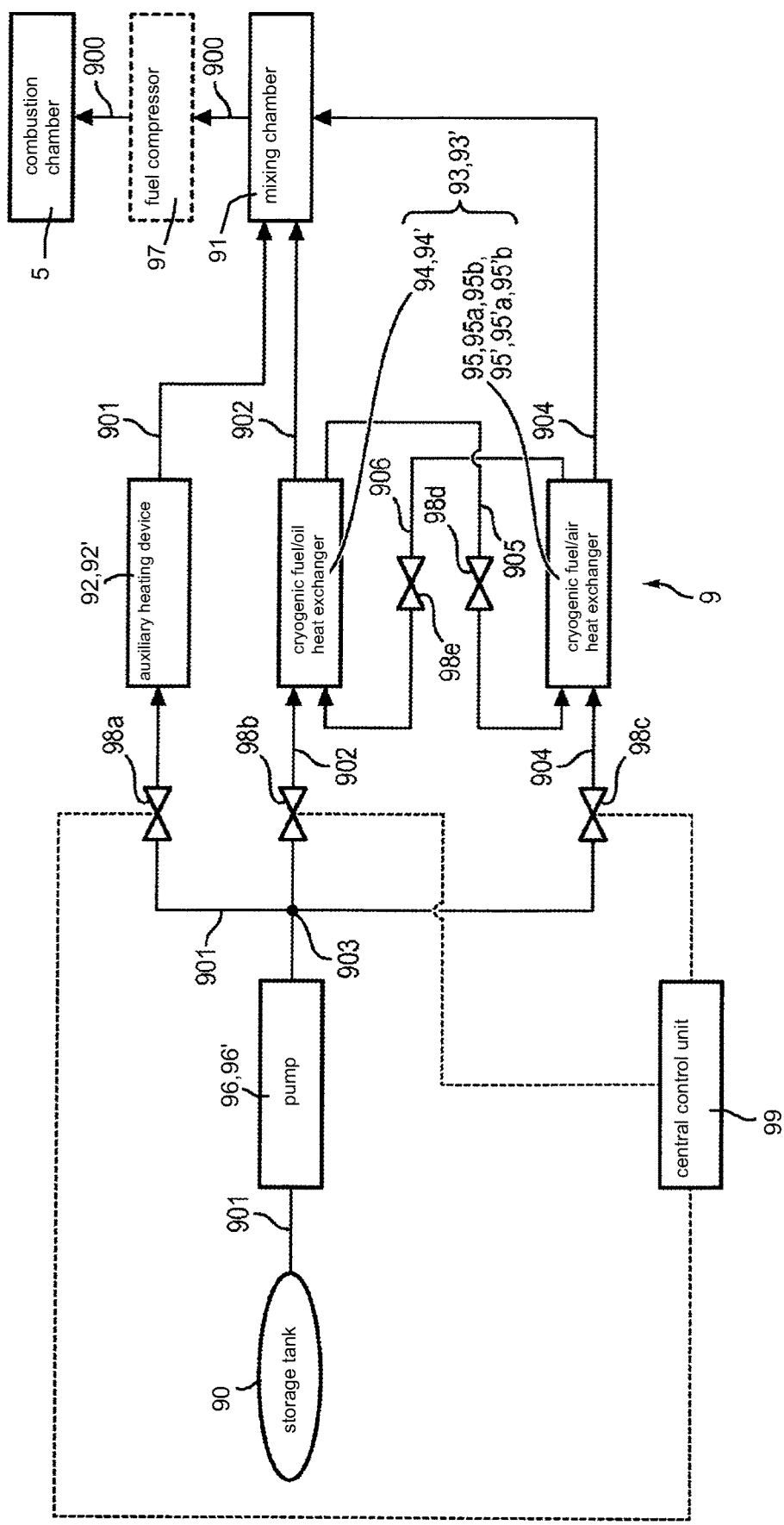
FIG. 2 is a schematic view of the cryogenic fuel supply system for the combustion chamber of the turbine engine of an aircraft, according to the invention.

In order to do this, according to a first embodiment, shown in FIG. 2, a bypass line 905, provided with a flow distribution device 98d, connects the outlet of the heat exchanger 94 to the inlet of the heat exchanger 95, 95a, 95b and a bypass line 906, provided with a flow distribution device 98e, connects the outlet of the heat exchanger 95, 95a, 95b to the inlet of the heat exchanger 94.

These flow distribution devices 98b, 98c, 98d and 98e are preferably valves and will be referred to as such in the remainder of the description.

The opening and closing of the various valves 98a, 98b, 98c, 98d and 98e are controlled by a central control unit 99. This central unit can be a computing device, such as a computer or a programmable logic controller.

This computing device comprises a memory in which a program (computer program) is stored, which includes code instructions for implementing a control method of said supply system 9 and in particular for the opening and closing of the various valves 98a to 98e.

Through this mounting, it is possible by opening valves 98b and 98c and closing valves 98d and 98e, to have a parallel mounting of exchangers 94 and 95. By opening valve 98b and 98d and closing valves 98c and 98e, it is possible to have a series mounting of the exchangers 94 and 95, the exchanger 94 being upstream of exchanger 95, with respect to the direction of circulation of the cryogenic fuel in these exchangers. Inversely, by opening valves 98c and 98e and closing valves 98b and 98d, it is possible to have a series mounting of the exchangers 94 and 95, but the exchanger 95 this time being upstream with respect to exchanger 94.

Although this is not shown in the figures, it is also possible, according to a second embodiment, to have a single line connecting the pump 96 to the mixing chamber 91 and wherein the exchangers 94 and 95 are mounted in series, according to a predetermined order, and without the bypass lines 905 and 906.

Whatever the chosen solution, when the exchangers 94 and 95 are in series, the line in which they are mounted is in parallel with the line 901. Hence, at any time, it is possible to heat a portion of the cryogenic fuel by using the auxiliary heating device 92, if ever the flow rate of heated cryogenic fuel in the heat exchanger assembly 93 is insufficient.

Another embodiment is also possible. It differs from the preceding embodiment in that the above-mentioned heat exchanger assembly 93 is replaced by a heat exchanger assembly 93' which comprises a cryogenic fuel/oil heat exchanger 94', referred to as "supercritical", and a heat exchanger 95' between the cryogenic fuel and the air circulating in the primary duct 11 of the turbine engine 1, referred to as "supercritical", whether of the inter-compressor cooling exchanger type 95'a or of the heat recuperator type 95'b.

The heat exchanger 94' and heat exchanger 95', 95'a, 95'b are referred to as "supercritical" because they can bring the cryogenic fuel to a temperature greater than its critical temperature.

As a reminder, it will be recalled that hydrogen has a critical point at 32K (minus 241.15° C.) for its critical temperature and 12.8 bars (12.8.10$^5$ Pa) for its critical pressure, and that natural gas has a critical point at 190 K (minus 83.15° C.) for its critical temperature and 46.8 bars (46.8.10$^5$ Pa) for its critical pressure.

Preferably, when the above-mentioned supercritical exchangers 94', 95', 95'a and 95'b and supercritical auxiliary heating device 92' are used, the supercritical pump 96' will be used upstream.

The cryogenic fuel is thus transported to the mixing chamber 91 then to the combustion chamber 5 in the supercritical fluid state.

The remainder of the system, the parallel or series connections and the valves remain identical to that which has been previously described.

The method for controlling the system 9 will now be described.

The central control unit 99 receives information concerning the flight mode (take-off, climb, cruise, etc.) and the flow rate of supercritical or gaseous cryogenic fuel to be delivered to the combustion chamber 5.

The heating needs of the cryogenic fuel are proportional to the flow rate of the supercritical or gaseous fuel to be delivered to the combustion chamber 5. However, this flow rate is much larger at take-off than in any other flight phase.

The central unit 99 controls the opening and closing of valves 98b, 98c, 98d and 98e so that during the climb or cruise flight phases, the cryogenic fuel is heated and brought into the supercritical or gaseous phase by its passage through the heat exchanger assembly 93' or 93, the valve 98a being closed.

Furthermore, during the take-off phase or when an additional flow of cryogenic fuel is needed, valve 98a is also open, so that an additional volume of cryogenic fuel can be heated and vaporised or brought into the supercritical phase in the auxiliary heating device 92 or 92' respectively. This vaporised or supercritical fuel is then mixed, in the chamber 91, with the other gaseous or supercritical fuel flows coming from exchangers 94 and 95, or 94' and 95' respectively.

Furthermore, inside the assembly 93, 93', the liquid cryogenic fuel is mainly directed to the cryogenic fuel/oil exchanger 94, 94' in order to ensure the cooling of the oil. However, the oil must not drop below a certain temperature, in order to maintain its low viscosity. To this effect, temperature sensors make it possible to know the cooling needs of the oil and to send the cryogenic fuel flow rate corresponding to this need. The remainder of the fuel flow passes into the exchanger 95, 95'.

The invention claimed is:

1. A cryogenic fuel supply system for a combustion chamber of an aircraft turbine engine, the aircraft turbine engine being a twin-spool turbine engine successively comprising a low-pressure air compressor, a high-pressure air compressor, the combustion chamber, a high-pressure turbine and a low-pressure turbine, the cryogenic fuel supply system comprising:
a storage tank for cryogenic fuel in a liquid state,
a mixing chamber receiving various flows of cryogenic fuel in a supercritical or gaseous state, the mixing chamber being connected to the combustion chamber in order to supply the combustion chamber with cryogenic fuel in the supercritical or gaseous state,
an auxiliary heating device mounted in a line which connects said the storage tank to the mixing chamber, the auxiliary heating device enabling heating of the cryogenic fuel,
a heat exchanger assembly, connected to the cryogenic fuel tank and to the mixing chamber, and mounted in parallel with the auxiliary heating device, the heat exchanger assembly comprising a cryogenic fuel/oil heat exchanger and a heat exchanger between the cryogenic fuel and air circulating in a primary duct of the aircraft turbine engine, the heat exchanger between the cryogenic fuel and the air circulating in the primary duct of the turbine engine being a heat recuperator performing heat exchange with the air taken in the primary duct, downstream of the turbine of the turbine engine, or being an inter-compressor cooling exchanger, disposed between the low-pressure air compressor and the high-pressure air compressor and performing heat exchange with the air taken in the primary duct, downstream of the low-pressure air compressor of the turbine engine, and being mounted in parallel with the cryogenic fuel/oil heat exchanger, a flow distribution device disposed upstream of the auxiliary heating device, at least one flow distribution device disposed upstream of the heat exchanger assembly, and a central control unit that controls opening and closing of the flow distribution device and the at least one flow distribution device.

2. The cryogenic fuel supply system according to claim 1, wherein the system further comprises a pump, disposed at an outlet of the liquid cryogenic fuel tank and upstream of the auxiliary heating device and of the heat exchanger assembly, wherein the pump brings the cryogenic fuel originating from the storage tank to a pressure greater than a critical pressure of the cryogenic fuel.

3. The cryogenic fuel supply system according to claim 1, wherein the auxiliary heating device, the cryogenic fuel/oil heat exchanger and the heat exchanger between the cryogenic fuel and the air circulating in the primary duct of the aircraft turbine engine are supercritical exchangers that can bring the cryogenic fuel to a temperature greater than a critical temperature.

4. The cryogenic fuel supply system according to claim 1, wherein the system further comprises a pump, disposed at the outlet of the liquid cryogenic fuel tank and upstream of the auxiliary heating device and of the heat exchanger assembly, the pump being able to pressurise the cryogenic fuel leaving the tank, in order that the cryogenic fuel is totally liquid.

5. The cryogenic fuel supply system according to claim 1, wherein the auxiliary heating device, the cryogenic fuel/oil heat exchanger and the heat exchanger between the cryogenic fuel and the air circulating in the primary duct of the turbine engine are two-phase exchangers which heat the cryogenic fuel in the liquid state in order to bring the cryogenic fuel into the gaseous state.

6. The cryogenic fuel supply system according to claim 1, wherein the auxiliary heating device is an electrical or thermal device.

7. The cryogenic fuel supply system according to claim 1, wherein the inter-compressor cooling exchanger is mounted in series with the cryogenic fuel/oil heat exchanger.

8. The cryogenic fuel supply system according to claim 7, wherein the inter-compressor cooling exchanger is mounted upstream of the cryogenic fuel/oil heat exchanger.

9. The cryogenic fuel supply system according to claim 1, wherein the heat recuperator and the cryogenic fuel/oil heat exchanger are mounted in series.

10. The cryogenic fuel supply system according to claim 9, wherein the heat recuperator is mounted upstream of the cryogenic fuel/oil heat exchanger.

11. The cryogenic fuel supply system according to claim 9, wherein the heat recuperator is mounted downstream of the cryogenic fuel/oil heat exchanger.

12. The cryogenic fuel supply system according to claim 1, wherein the system further comprises a fuel compressor, disposed between the mixing chamber and the combustion chamber.

13. The cryogenic fuel supply system according to claim 1, wherein the cryogenic fuel is liquefied natural gas or liquid hydrogen.

14. The cryogenic fuel supply system according to claim 1, wherein the flow distribution device is a valve.

15. A twin-spool turbine engine of an aircraft successively comprising a low-pressure air compressor, a high-pressure air compressor, a combustion chamber, a high-pressure turbine and a low-pressure turbine, wherein the twin-spool turbine engine comprises a cryogenic fuel supply system for said combustion chamber, the cryogenic fuel supply system comprising:

a storage tank for cryogenic fuel in a liquid state, a mixing chamber receiving various flows of cryogenic fuel in a supercritical or gaseous state, the mixing chamber being connected to the combustion chamber in order to supply the combustion chamber with cryogenic fuel in the supercritical or gaseous state, an auxiliary heating device mounted in a line which connects said the storage tank to the mixing chamber, the auxiliary heating device enabling heating of the cryogenic fuel, a heat exchanger assembly, connected to the cryogenic fuel tank and to the mixing chamber, and mounted in parallel with the auxiliary heating device, the heat exchanger assembly comprising a cryogenic fuel/oil heat exchanger and a heat exchanger between the cryogenic fuel and air circulating in a primary duct of the aircraft turbine engine, the heat exchanger between the cryogenic fuel and the air circulating in the primary duct of the twin-spool turbine engine being an inter-compressor cooling exchanger, disposed between the low-pressure air compressor and the high-pressure air compressor and performing heat exchange with the air taken in the primary duct, downstream of the low-pressure air compressor of the turbine engine, and being mounted in parallel with the cryogenic fuel/oil heat exchanger, a flow distribution device disposed upstream of the auxiliary heating device, at least one flow distribution device disposed upstream of the heat exchanger assembly, and a central control unit that controls opening and closing of the flow distribution device and the at least one flow distribution device.

16. A method for controlling the cryogenic fuel supply system of claim 1, wherein the method comprises:

opening the flow distribution device disposed upstream of the auxiliary heating device and the at least one flow distribution device disposed upstream of the heat exchanger assembly, so as to cause the cryogenic fuel that is to be heated, to circulate in the auxiliary heating device and in the heat exchanger assembly, during the take-off phase of the aircraft, and closing the flow distribution device disposed upstream of the auxiliary heating device and opening the at least one flow distribution device disposed upstream of the heat exchanger assembly, so as to cause the cryogenic fuel that is to be heated, to circulate only in the heat exchanger assembly, during the other flight phases of the aircraft.

* * * * *